Jan. 25, 1955

O. J. SWENSON 2,700,222

LEVEL RESPONSIVE APPARATUS

Filed Jan. 26, 1952

Inventor:
Oscar Joseph Swenson

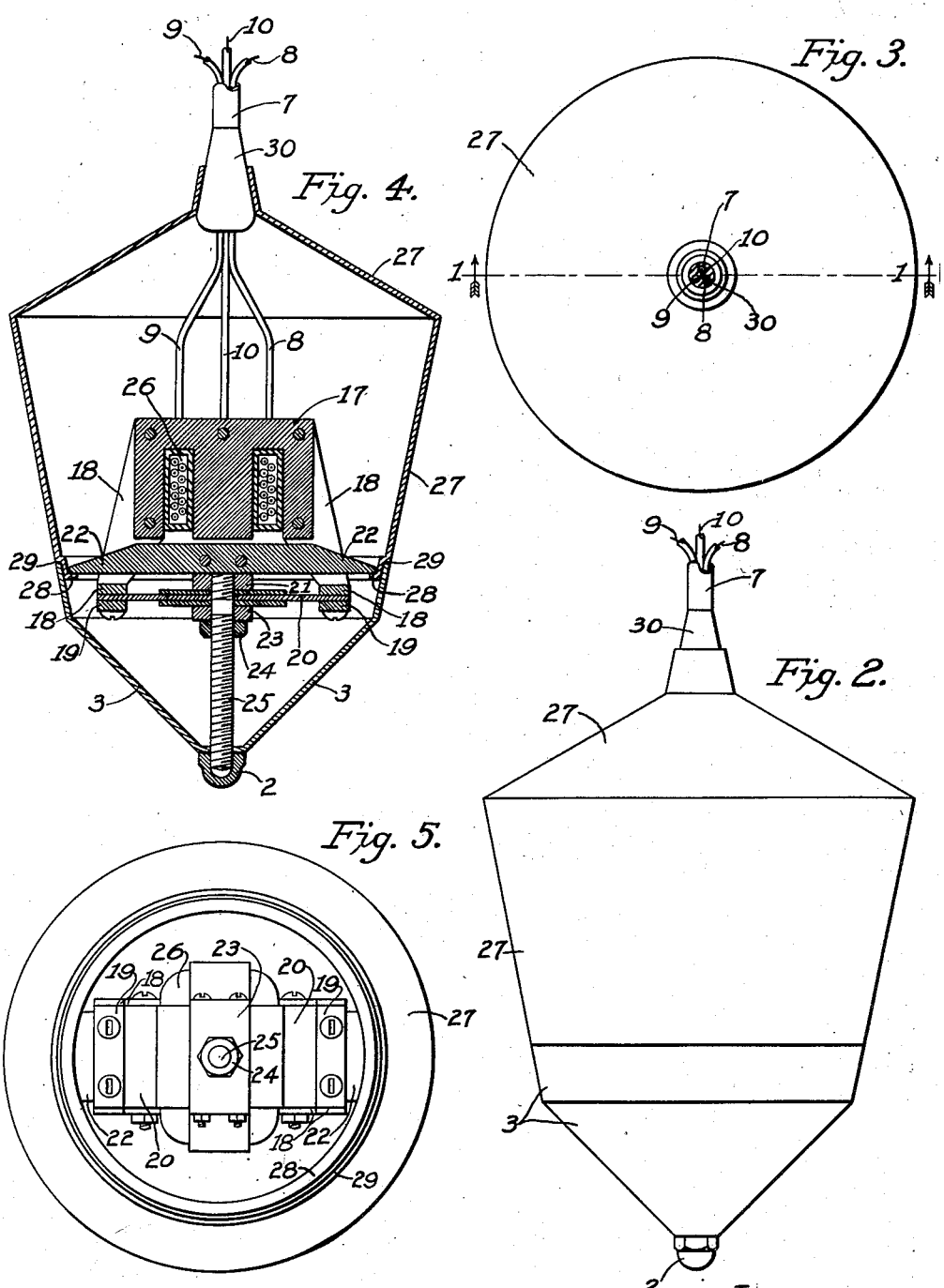

Jan. 25, 1955   O. J. SWENSON   2,700,222
LEVEL RESPONSIVE APPARATUS
Filed Jan. 26, 1952   3 Sheets-Sheet 3

Inventor:
Oscar Joseph Swenson

United States Patent Office 2,700,222
Patented Jan. 25, 1955

2,700,222

LEVEL RESPONSIVE APPARATUS

Oscar Joseph Swenson, Crystal Lake, Ill.

Substituted for abandoned application Serial No. 343,395, July 1, 1940. This application January 26, 1952, Serial No. 268,393

6 Claims. (Cl. 33—126.5)

This invention relates to a level responsive apparatus and more particularly to an apparatus for determining the surface level of a confined body of a flowable solid material. The invention further relates to a method for determining the surface level of a confined body of a flowable solid.

By the term "flowable solid material" as used herein it is intended to include any granular material which may be placed in a fluidized condition by the use of flowing gases. In this class may be included grains such as wheat, and other granular material such as catalysts and sand. Pulverulent materials are likewise included and members of this class include dry cement, powdered coal and the like. Pasty materials may also be included in the above term, for example, wet cement and sand mixtures or any other wet or dry mass of material having sufficient mobility to allow it to flow, but having insufficient mobility to cause it to raise to its surface by a buoyant effect, a body submerged in said material and weighing less than the amount of said material displaced by the body. Another term which may be used as an equivalent is the term "mobile but non-fluid material."

One of the principal difficulties in the materials handling industry arises from the difficulty or impossibility of measuring and recording the surface level of a flowable solid material in elevators, silos and other large enclosed containers. At the present time it is possible to determine the level only at a few fixed elevations by remote apparatus, or by visual observation from the top or from within the container.

It is an object of this invention to provide an apparatus for continuous indication, recording or control of the surface level of a confined body of a flowable solid through the full range of its variations.

Another object of the invention is to provide simple, inexpensive apparatus for continuously determining the surface level of a flowable solid in a container.

A further object of the invention is to provide a method for continuously determining the surface level of a confined flowable solid.

The foregoing and numerous other important objects, advantages, and inherent functions of the invention will become apparent as the same is more fully understood from the following description, which, taken in connection with the accompanying drawings, discloses a preferred embodiment of the invention.

In the drawings:

Figure 2 is an enlarged side elevational view of one form of level responsive float according to the invention;

Figure 3 is a top plan view of the float illustrated generally in Figure 2;

Figure 4 is a sectional view taken along the lines 1—1 of Figure 3 in the direction of the arrows;

Figure 6:
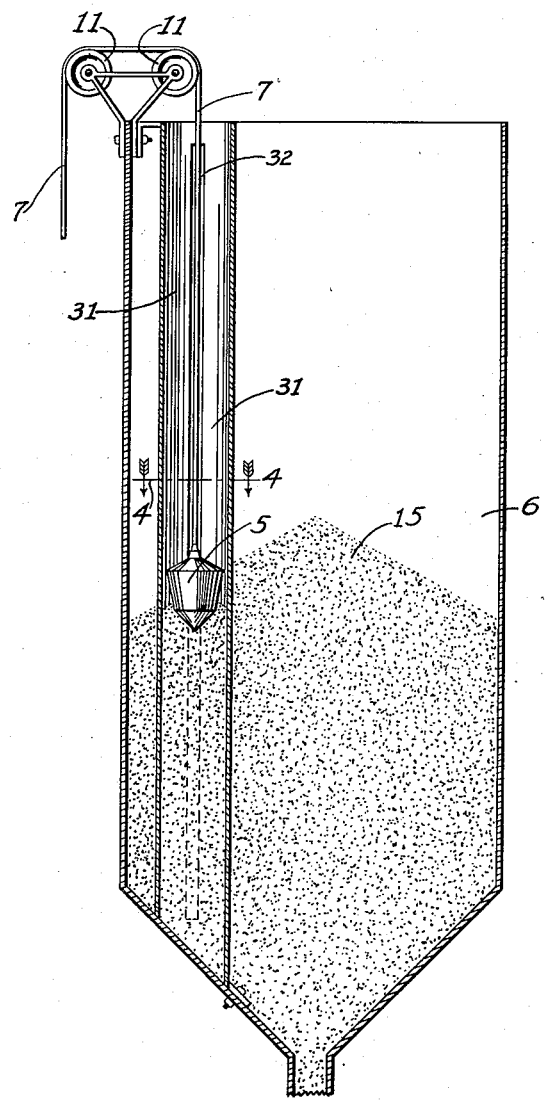
Figure 7:
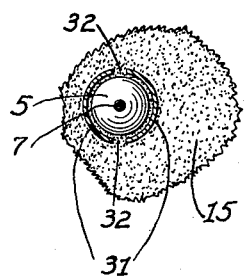

Figure 5 is a view of the bottom of the body illustrated in Figures 2, 3 and 4, after removing assembly nut 2 and bottom shell 3;

Figure 6 is a vertical sectional view of another embodiment of the invention showing the float adapted for reciprocation in a tubular guide means; and Figure 7 is a horizontal sectional view taken along the lines 4—4 of Figure 6.

In accomplishing the foregoing objects and in accordance with the present invention there is now provided a novel and useful level responsive apparatus for determining the surface level of a flowable solid material in a container. The apparatus comprises a float which is adapted for suspension within the container in contact with the surface of a flowable solid. The float contains means for imparting a vibratory or reciprocating motion thereto. The float and its contained vibratory means are suspended in such a manner that they will weigh less than an amount of the solid material which they displace. Then by the action of the vibratory motion, the float will seek the surface of the material and will remain there so long as the vibratory motion is continued.

The float is suspended so that it is free to move vertically throughout the distance between the lower and upper limits of the surface of the material in the container. At least a part of the weight of the float must be supported by the material in order to insure that the float will follow the surface of the material when the surface is lowered in the container. When the surface of the material is rising, the vibratory motion of the float causes it to react against the material in the container, and since it is lighter in weight than an equal volume of the flowable solid material it will tend to rise to the surface thereof.

A detailed description of one preferred embodiment of the invention will be given in which similar numerals refer to similar parts throughout the several drawings and views.

Figure 1:
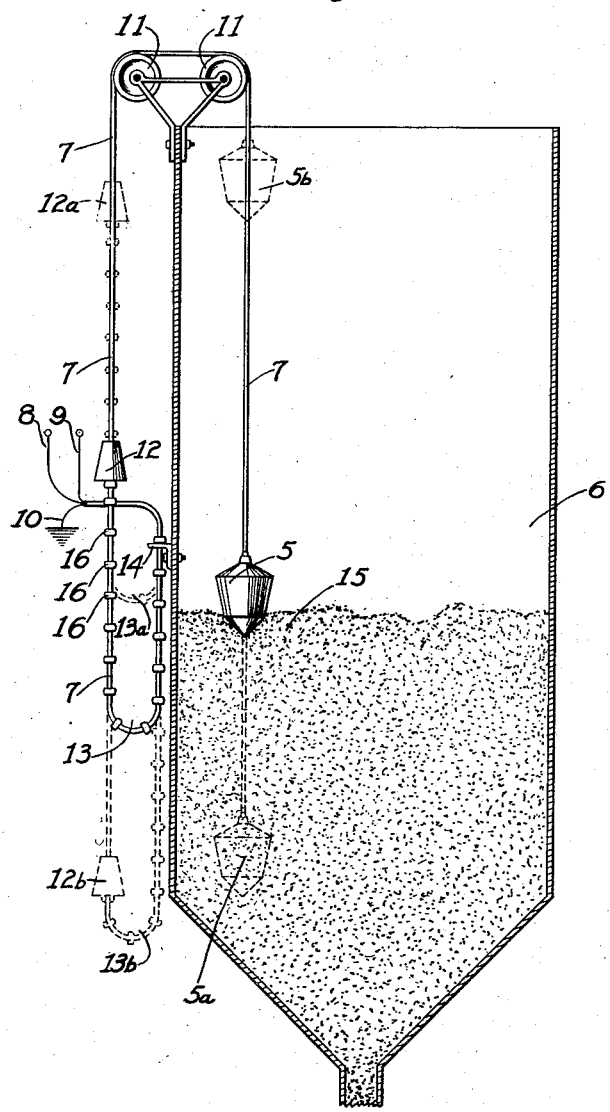
Figure 1 is a vertical sectional view of a container having one embodiment of the level responsive apparatus of this invention suspended therein.

Referring to Figure 1, the body 5, consisting of a closed chamber of metal containing an electrically-driven vibrator and whose construction will be explained in detail later, is suspended in a bin 6, by a flexible, electrically insulated cable 7, which contains insulated electrical conductors. In the drawing three such electrical conductors are shown, and are designated as 8, 9 and 10. Conductors 8 and 9 are connected to the power unit of the electrical vibrator at one end, and at the other end to a source of alternating or pulsating electrical current (not shown). One end of conductor 10 is connected electrically inside the metal chamber mentioned above and the other end is grounded at a point outside the bin as shown. This grounding is merely to insure against the acquiring of any electrical charge by the body.

The cable 7 operates over a system of pulleys 11—11 and passes through weight 12 to which it is firmly attached, downward, around the loop 13 and upward through the bracket 14 to which it is also firmly attached. The cable 7 thus hangs freely below weight 12 and bracket 14, forming the loop 13.

The body 5 connected in the system described above is free to move vertically between bottom and top of the bin as indicated by the dotted figures 5a and 5b respectively while the weight 12 moves between the top position indicated by dotted figure 12a and the bottom position indicated by the dotted figure 12b respectively. The loop 13 moves between the positions indicated by the dotted lines 13a and 13b respectively.

The weight 12 is adjusted so that the system balances over the pulleys 11—11 in the direction which requires the body 5 to rest with at least part of its weight on the material 15 and thus to follow the surface of the material downward should this surface fall because of withdrawal of material from the bin.

It is usually desirable that the force with which the body 5 rests on the material 15 be maintained the same regardless of the position the body assumes in its vertical path in the bin. To insure this, it is necessary to provide means for compensating for the weight of the cable 7 which necessarily shifts from one side of the pulleys 11—11 to the other when the body 5 changes position.

This compensation is accomplished by several weights 16, 16, 16, etc. attached to the cable 7 between weight 12 and the bracket 14. As the body 5 moves downward more of cable 7 and hence more weight, is shifted to the right side of pulleys 11—11 thus tending to increase the force with which the body rests on the material 15. At the same time, however, additional weight is being picked up by cable 7 on the left side of the pulleys 11—11 by additional numbers of the weights 16, 16 being transferred from the right side to the left side of loop 13. Conversely, as the body 5 moves upward the shift in weight of cable 7 from right to left side of pulleys 11—11 is counteracted by a decrease in the number of weights 16, 16, 16 on the left side of loop 13. By proper choice of size and spacing on the cable 7 of the weights 16, 16, 16, etc. the shift in weight of cable 7 from one side of the pulleys 11—11 to the other when the body 5 changes position, will be compensated for and the body 5 will rest with the same force on the material 15 at any position it assumes between top and bottom of the bin.

It has been described how the body 5 will follow the surface of the material 15 when the surface is falling because of material being withdrawn from the bin. While body 5 falls, weight 12 will rise the same distance thus serving as an external indication of the change in level of the material in the bin.

To cause the body 5 to maintain its position substantially at the surface of the material 15 when the surface of the material is rising because of material being added to the bin, an alternating or pulsating electric current is passed through the conductors 8 and 9 by means of the electrical circuit already mentioned. This actuates the electrical vibrator inside body 5 and causes the body to vibrate vertically. Under the influence of this vibration the body 5 is carried upward by the material 15, substantially at the surface of the material, which is rising because of material being added to the bin. The weight 12 necessarily falls as the body 5 rises and again serves as an external indication of the position of the surface of the material in the bin.

The electrical vibrator can be operated continuously and the body 5 will fall when the surface of material falls, rise when the surface of the material rises, or remains stationary when the surface of the material remains stationary. The position of body 5 and hence the external weight 12 thus serves as a continuous indication of the position of the surface of the material in the bin. If desired the vibrator can be operated intermittently or only when the surface of the material rises.

Since the movable parts of the system described move continuously in direct accordance with the change in position of the surface of the material in the bin, it is obvious that any of the types of indicating or recording instruments common in industry can be connected in any of several known ways to the most convenient movable part of the system to indicate or record locally or remotely the position of the surface in the bin.

Likewise, by proper connection of various control devices common in industry, the position of the movable parts of the system can be made to control the rate of addition or withdrawal of the material from the bin in accordance with the position of the surface of the material in the bin, and thus to control the position of the surface of the material at any desired elevation or between any desired limits of elevation in the bin.

All the methods mentioned above for indicating, recording or controlling the position of the surface of the material in the bin also apply to indicating, recording or controlling the quantity of material in the bin, because in any specific bin the position of the surface of the material is an index of the quantity of material in the bin.

My preferred construction of the body 5 is illustrated on a scale enlarged over that in Figure 1, in Figures 2, 3, 4 and 5. An iron core 17 contains a coil of insulated electrically conductive wire 26, opposite ends of which are connected electrically to electrical conductors 8 and 9. The core 17 itself is connected electrically to electrical conductor 10 which is grounded at its other end as explained previously. The combination of coil 26 and core 17 thus constitutes an electromagnet. Core 17 is rigidly attached by frame members 18—18 and clamp bars 19—19 to the opposite ends of a leaf spring system 20. An iron armature 22 is rigidly attached to bar 21 which in turn is rigidly attached to the center of the leaf spring system 20 by means of clamp bar 23, bolt 25 and nut 24. A clearance is provided between armature 22 and core 17 which allows them to vibrate with respect to one another by flexing the spring system 20 when an alternating or pulsating electric current is supplied to coil 26 through conductors 8 and 9. The combination of parts thus described constitutes the electrical vibrator referred to previously.

The electrical vibrator unit described above is supported inside the metal chamber 27 by inserting it in such way that the ends of the armature 22 rest on top of the circular shoulder 28 which is a part of chamber 27. The armature 22 is held firmly downward against the shoulder 28 by placing the conical metal shell 3 over bolt 25 and against the circular shoulder 29 which is a part of chamber 27 and then applying and tightening nut 2 on bolt 25. Shell 3 also serves to completely seal the bottom opening of chamber 27.

A tapered plug 30 is firmly attached to the end of cable 7 allowing electrical conductors 8, 9 and 10 to continue through it. When cable 7 is pulled through the tapered opening in the top of chamber 27, the plug 30 is pulled tightly into the tapered opening, thus serving to attach the cable 7 to chamber 27 as well as to seal the tapered opening in the top of chamber 27. With its top opening sealed by plug 30 and its bottom opening sealed with shell 3 and nut 2 chamber 27 thus becomes a completely closed chamber.

The combination of the electric vibrator supported inside the closed chamber as just described constitutes the body 5 referred to previously.

The closed chamber consisting of parts 2, 3, 27 and 30, thus rigidly attached to the armature 22 and thence to the center of the spring system 20 as described above is caused to vibrate vertically in opposition to the core 17 which is attached to the ends of spring system 20 as described above when an alternating or pulsating electrical current is passed through coil 26.

In some instances material is added to or withdrawn from a bin in such manner that the surface of the material is inclined at substantially the natural angle of repose of the material. Under these conditions it is sometimes desirable to provide means for guiding the body 5 in substantially a vertical path to prevent it from sliding laterally along the inclined surface of the material.

One means for thus guiding the body 5 in substantially a vertical path is illustrated in Figure 6. Body 5 is suspended by cable 7 in the same manner as previously described in connection with Figure 1 so the illustration of the assembly of cable 7 and balance weights 12 and 16, 16, 16, etc. to the left of pulleys 11—11 in Figure 6 is omitted. In addition, however, the body 5 is surrounded by a vertically disposed cylindrical metal casing 31 of inside diameter slightly greater than the greatest outside diameter of body 5 so the body can move freely upward or downward inside the casing. The cylindrical casing contains two longitudinal slots running on opposite sides essentially the entire length of the casing.

As the surface of the material rises when material is added to the bin, material flows into the casing through the slots 32—32 filling it to essentially the same level as the surrounding material and causing the body 5 to rise with the surface of the material in the manner described previously. As the surface of the material falls, when material is withdrawn from the bin, material flows out of the casing through the slots 32—32 causing the body 5 to fall with the surface of the material in the manner described previously.

It is desirable to orient the casing 31 and arrange the charging and discharging ports of the bin so that a diameter of the cylindrical casing, passing through the vertical center line of both slots 32—32, lies in the plane of the inclined surface of the material both when material is being added to or withdrawn from the bin. If this condition is obtained, the body 5 will be guided in its rise and fall inside the casing 31 without touching the casing. By properly locating the casing in the horizontal cross-section of the bin, a given position of body 5 will indicate substantially the same quantitative content of the bin in either a cycle of rising surface or falling surface providing that either cycle has continued for a time sufficiently long to establish a continuous surface of material.

It will be understood, of course, that the invention is not limited to the preferred embodiment which has previously been described in detail. Instead it is contemplated that the electrical vibrating apparatus may be replaced with a mechanical vibrator which may operate from energy stored in a spring or the like. It is also contemplated that compressed air may be used as the driving force for a vibrator and in this case the compressed air may be led to the vibrating apparatus in the float through a hollow cable similar to the cable 7 illustrated in the drawings.

It should also be understood that the float may be suspended in any other suitable way which will allow it to rise and fall as the surface of the material in the container rises and falls. The guide means for maintaining substantially vertical movement of the float may be other than tubular so long as it provides guidance for the float and communicates freely with the body of flowable solid.

It is thought that the invention and its numerous attendant advantages will be fully understood from the foregoing description and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

This application is a substitute application for my application Serial No. 343,395, filed July 1, 1940, and now abandoned.

The invention is hereby claimed as follows:

1. A level-responsive apparatus for determining the surface level of a flowable solid material in a container which comprises float means adapted to be supported by said surface, means for suspending said float within said container in contact with said surface and means within said float for imparting vibratory motion thereto independently of said suspending means, said float means containing said vibratory means having an effective weight less than that of a like volume of flowable solid displaced thereby.

2. A level-responsive apparatus for determining the surface level of a flowable solid material in a container which comprises float means adapted to be supported by said surface, means for suspending said float within said container in contact with said surface, and electrical means within said float for imparting vibratory motion thereto independently of said suspending means, said float means containing said vibratory means having an effective weight less than that of a like volume of flowable solid displaced thereby.

3. A level-responsive apparatus for determining the surface level of a flowable solid material in a container which comprises float means adapted to be supported by said surface, counterweighted pulley means for suspending said float for vertical reciprocation within said container in contact with said surface, and vibratory means within said float for imparting vibratory motion thereto independently of said suspending means, said float means containing said vibratory means having an effective weight less than that of a like volume of flowable solid displaced thereby.

4. A level-responsive apparatus for determining the surface level of a flowable solid material in a container which comprises float means adapted to be supported by said surface, means for suspending said float within said container in contact with said surface, guide means communicating with the body of said flowable material for guiding said float in a substantially vertical path, and means within said float for imparting vibratory motion thereto independently of said suspending means, said float means containing said vibratory means having an effective weight less than that of a like volume of flowable solid displaced thereby.

5. A level responsive apparatus for determining the surface level of a flowable solid material in a container which comprises hollow float means adapted to be supported by said surface, counterweighted pulley means for suspending said float for vertical reciprocation within said container in contact with said surface, guide means communicating with the body of said flowable material for guiding said float in a substantially vertical path, and electrically actuated vibratory means within said float for imparting vibratory motion thereto independently of said suspending means, said counterweighted float means and vibratory means being lighter than a like volume of flowable solid displaced thereby.

6. A level-responsive apparatus for determining the surface level of a flowable solid material in a container which comprises a float adapted to be supported by said surface, means for suspending said float within said container in contact with said surface, means for maintaining the effective weight of said suspended float substantially constant, and means within said float for vertically vibrating said float independently of said suspending means, said effective weight being less than that of a like volume of solid material displaced by said float.

References Cited in the file of this patent

UNITED STATES PATENTS

| Number | Name | Date |
|---|---|---|
| 1,714,515 | Middleboe | May 28, 1929 |
| 2,216,036 | Lang | Sept. 24, 1940 |
| 2,302,536 | Edwards | Nov. 17, 1942 |

FOREIGN PATENTS

| Number | Country | Date |
|---|---|---|
| 121,504 | Austria | Feb. 25, 1931 |